United States Patent
Ahn et al.

(10) Patent No.: US 11,166,039 B2
(45) Date of Patent: Nov. 2, 2021

(54) METHOD AND DEVICE FOR VIDEO CODING USING VARIOUS TRANSFORM TECHNIQUES

(71) Applicant: INTELLECTUAL DISCOVERY CO., LTD., Seoul (KR)

(72) Inventors: Yong Jo Ahn, Seoul (KR); Ho Chan Ryu, Seoul (KR)

(73) Assignee: INTELLECTUAL DISCOVERY CO., LTD., Seoul (KR)

(*) Notice: Subject to any disclaimer, the term of this patent is extended or adjusted under 35 U.S.C. 154(b) by 0 days.

(21) Appl. No.: 16/962,730

(22) PCT Filed: Jan. 15, 2019

(86) PCT No.: PCT/KR2019/000603
§ 371 (c)(1),
(2) Date: Jul. 16, 2020

(87) PCT Pub. No.: WO2019/143103
PCT Pub. Date: Jul. 25, 2019

(65) Prior Publication Data
US 2020/0351511 A1    Nov. 5, 2020

(30) Foreign Application Priority Data
Jan. 17, 2018   (KR) .................. 10-2018-0005898

(51) Int. Cl.
*H04N 19/44*   (2014.01)
*H04N 19/136*  (2014.01)
*H04N 19/184*  (2014.01)
*H04N 19/60*   (2014.01)

(52) U.S. Cl.
CPC .......... *H04N 19/44* (2014.11); *H04N 19/136* (2014.11); *H04N 19/184* (2014.11); *H04N 19/45* (2014.11); *H04N 19/60* (2014.11)

(58) Field of Classification Search
CPC .... H04N 19/60; H04N 19/136; H04N 19/184; H04N 19/44; H04N 19/45
See application file for complete search history.

(56) References Cited

U.S. PATENT DOCUMENTS

| | | | |
|---|---|---|---|
| 9,300,973 B2* | 3/2016 | Lee | H04N 19/159 |
| 9,609,360 B2* | 3/2017 | Oh | H04N 19/159 |
| 9,716,894 B2* | 7/2017 | Joshi | H04N 19/593 |
| 10,027,972 B2* | 7/2018 | Han | H04N 19/176 |

(Continued)

FOREIGN PATENT DOCUMENTS

| | | |
|---|---|---|
| KR | 101549910 B1 | 9/2015 |
| KR | 10-2017-0089035 A | 8/2017 |

(Continued)

OTHER PUBLICATIONS

Transform skip mode; Mrak—2011; (Year: 2011).*

(Continued)

*Primary Examiner* — Luis Perez-Fuentes
(74) *Attorney, Agent, or Firm* — Sughrue Mion, PLLC

(57) ABSTRACT

The present invention relates to a method and a device for decoding an image, which improve encoding and decoding efficiency by performing various forms of transform and inverse transform during transform and inverse transform processes of a video coding technique.

10 Claims, 10 Drawing Sheets

(56) References Cited

U.S. PATENT DOCUMENTS

| | | | |
|---|---|---|---|
| 10,250,881 B2* | 4/2019 | Song | H04N 19/182 |
| 10,264,283 B2* | 4/2019 | Lee | H04N 19/122 |
| 10,419,759 B2* | 9/2019 | Lee | H04N 19/44 |
| 10,887,591 B2* | 1/2021 | Sim | H04N 7/18 |
| 2012/0201300 A1 | 8/2012 | Kim et al. | |
| 2014/0247866 A1 | 9/2014 | Lee et al. | |
| 2014/0254675 A1 | 9/2014 | Lee et al. | |
| 2015/0117546 A1 | 4/2015 | Kim | |
| 2015/0131739 A1 | 5/2015 | Lee et al. | |
| 2015/0139297 A1 | 5/2015 | Kim | |
| 2015/0139307 A1 | 5/2015 | Lee et al. | |
| 2015/0172658 A1 | 6/2015 | Kim et al. | |
| 2015/0229924 A1 | 8/2015 | Kim et al. | |
| 2016/0373746 A1 | 12/2016 | Kim et al. | |
| 2020/0351511 A1* | 11/2020 | Ahn | H04N 19/184 |

FOREIGN PATENT DOCUMENTS

| | | |
|---|---|---|
| KR | 10-2017-0140145 A | 12/2017 |
| WO | 2011/031044 A2 | 3/2011 |
| WO | 2014/007524 A1 | 1/2014 |

OTHER PUBLICATIONS

Mode Dependent Coefficient Scanning; Zheng—2011; (Year: 2011).*
International Search Report for PCT/KR2019/000603 dated Apr. 18, 2019 [PCT/ISA/210].
Written Opinion for PCT/KR2019/000603 dated Apr. 18, 2019 [PCT/ISA/237].

* cited by examiner

| seq_parameter_set_rbsp() { | descriptor |
|---|---|
| ... | |
| use_intra_multiple_transform_flag | u(1) |
| use_inter_multiple_transform_flag | u(1) |
| ... | |
| secondary_transform_enabled_flag | u(1) |
| ... | |
| } | |

FIG. 9

| | coding unit() { | descriptor |
|---|---|---|
| 910 → | ... | |
| 920 → | multiple_transform_flag | ae(v) |
| | if(multiple_transform_flag) | |
| | { | |
| 930 → | multiple_transform_idx | ae(v) |
| | } | |
| | ... | |
| 940 → | secondary_transform_idx | ae(v) |
| | ... | |
| | } | |

FIG. 13

| 1310 → | seq_parameter_set_rbsp() { | descriptor |
|---|---|---|
| | ... | |
| 1320 → | scaling_list_enabled_flag | u(1) |
| | if(scaling_list_enabled_flag) | |
| | { | |
| 1330 → | sps_scaling_list_data_present_flag | u(1) |
| | if(sps_scaling_list_data_present_flag) | |
| | { | |
| 1340 → | scaling_list_data() | |
| | } | |
| | } | |
| | ... | |
| | } | |

| 1350 → | pic_parameter_set_rbsp() { | descriptor |
|---|---|---|
| | ... | |
| 1360 → | pps_scaling_list_data_present_flag | u(1) |
| | if(pps_scaling_list_data_present_flag) | |
| | { | |
| 1370 → | scaling_list_data() | |
| | } | |
| | ... | |
| | } | |

METHOD AND DEVICE FOR VIDEO CODING USING VARIOUS TRANSFORM TECHNIQUES

TECHNICAL FIELD

The present invention relates to a device and a method of decoding an image. More particularly, the present invention relates to a method and a device using various transform techniques in a video compression technique.

BACKGROUND ART

Recently, as demands for high-resolution and high-definition video have increased, necessity for a high-efficiency video compression technique for a next-generation video service has arisen. Based on such a necessity, studies and research to establish a video compression standard have been conducted.

In a video compression technique, a transform technique is a technique of changing a domain from a signal of a spatial domain to a signal of a frequency domain in order to effectively perform quantization and entropy encoding.

DISCLOSURE

Technical Problem

The present invention is intended to provide a method and a device for coding a video, wherein various transforms are used at a transform or inverse transform step of an encoder or a decoder, thereby improving encoding efficiency compared to the conventional video compression technique.

However, the technical problem to be solved by the present embodiment is not limited to the aforementioned technical problems, and other technical problems may be present.

Technical Solution

In order to solve the problem, according to an embodiment of the present invention, there are provided a method and a device for coding a video including: extracting information on a transform type for first inverse transform from a bitstream; determining an inverse transform type selectively from multiple inverse transform types by using the extracted information; and performing horizontal or vertical inverse transform by using the determined inverse transform type.

In order to solve the problem, according to an embodiment of the present invention, there are provided a method and a device for coding a video including: determining a transform type of horizontal inverse transform or vertical inverse transform by extracting information on an inverse transform type for first inverse transform from a bitstream; and omitting horizontal inverse transform or vertical inverse transform according to the determined inverse transform type.

In order to solve the problem, according to an embodiment of the present invention, there are provided a method and a device for coding a video including: omitting second inverse transform according to a transform type of first inverse transform.

In order to solve the problem, according to an embodiment of the present invention, there are provided a method and a device for coding a video including: determining whether inverse transform is performed, according to a type of transform coefficient.

In order to solve the problem, according to an embodiment of the present invention, there are provided a method and a device for coding a video including: performing weighted inverse quantization by determining a weighted quantization parameter for each frequency according to a transform type of first inverse transform.

In order to solve the problem, according to an embodiment of the present invention, there are provided a method and a device for coding a video including: performing weighted inverse quantization by determining a weighted quantization parameter for each frequency according to a second inverse transform index.

Advantageous Effects

The present invention is intended to provide a method and a device using various transform techniques in order to improve encoding efficiency.

According to an embodiment of the present invention, various transform types are selectively used at a first transform or first inverse transform step, thereby improving encoding efficiency.

DESCRIPTION OF DRAWINGS

FIG. 9 is a diagram showing a method of signaling, by using coding unit syntax of syntax in a bitstream, information for performing various inverse transform techniques, in a method and a device using various inverse transform techniques according to an embodiment of the present invention.

FIG. 13 is a diagram showing a method of signaling information for weighted quantization by using syntax, when various inverse transforms or second inverse transform is performed according to an embodiment of the present invention.

BEST MODE

Figure 1:
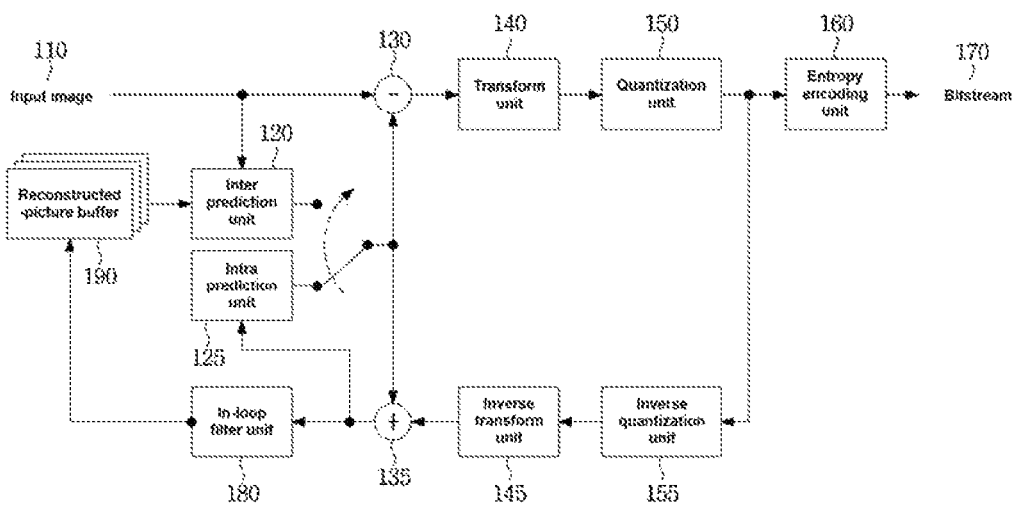
FIG. 1 is a block diagram showing a configuration for a method and a device for encoding a video according to an embodiment of the present invention.

According to an embodiment of the present invention, there are provided a method and a device for coding a video including: extracting information on a transform type for first inverse transform from a bitstream; determining an inverse transform type selectively from multiple inverse transform types by using the extracted information; and performing horizontal or vertical inverse transform by using the determined inverse transform type.

According to an embodiment of the present invention, there are provided a method and a device for coding a video including: determining a transform type of horizontal inverse transform or vertical inverse transform by extracting information on an inverse transform type for first inverse transform from a bitstream; and omitting horizontal inverse transform or vertical inverse transform according to the determined inverse transform type.

According to an embodiment of the present invention, there are provided a method and a device for coding a video including: omitting second inverse transform according to a transform type of first inverse transform.

According to an embodiment of the present invention, there are provided a method and a device for coding a video including: determining whether inverse transform is performed, according to a type of transform coefficient.

According to an embodiment of the present invention, there are provided a method and a device for coding a video including: performing weighted inverse quantization by determining a weighted quantization parameter for each frequency according to a transform type of first inverse transform.

According to an embodiment of the present invention, there are provided a method and a device for coding a video including: performing weighted inverse quantization by determining a weighted quantization parameter for each frequency according to a second inverse transform index.

MODE FOR INVENTION

Hereinafter, embodiments of the present invention will be described in detail with reference to the accompanying drawings such that the present invention can be easily embodied by those skilled in the art to which the present invention belongs. However, the present invention may be embodied in various different forms and should not be limited to the embodiments set forth herein. Further, in order to clearly describe the present invention, parts that are not related to the description are omitted in the drawings, and like reference numerals designate like elements throughout the specification.

Throughout the specification, when a part is referred to as being "connected" to another part, the former may be "directly connected" to the latter, or may be "electrically connected" thereto with an intervening element therebetween.

In addition, throughout the specification, when a component "comprises" or "includes" an element, unless there is another opposite description thereto, the component does not exclude other elements but may further include the same.

The term "a step of doing something" or "a step of something" used throughout this specification does not mean "a step for something".

In addition, the terms "first", "second", etc. used in the specification can be used to describe various elements, but the elements should not be limited to the terms. The terms are only used to differentiate one element from other elements.

In addition, the components shown in the embodiments of the present invention are shown independently to represent different characteristic functions, but this does not mean that each component consists of separate hardware or one software constituent unit. That is, the components are described one by one for convenience of description. At least two components of the components may be combined into one component or one component may be partitioned into multiple components to perform functions. The integrated embodiments and the separate embodiments of each of the components are also included in the scope of the present invention without departing from the essence of the present invention.

In the various embodiments of the present invention described herein, the terms "~part", "-er/or", "~unit", "~module", "~block", etc. may refer to a unit for processing at least one function or operation, and may be implemented by hardware, software, or a combination thereof.

Hereinafter, a method and a device for coding a video using various transform techniques proposed according to an embodiment of the present invention will be described in detail with reference to FIG. 4.

FIG. 1 is a block diagram showing a configuration of a method and a device for encoding a video according to an embodiment of the present invention.

A method and a device for encoding a video according to an embodiment may include an inter prediction unit 120, an intra prediction unit 125, a subtractor 130, a transform unit 140, a quantization unit 150, an entropy encoding unit 160, an inverse transform unit 145, an inverse quantization unit 155, an adder 135, a bi-directional filter unit 180, an in-loop filter unit 180, and a reconstructed-picture buffer 190.

The inter prediction unit 120 performs motion prediction by using an input image 110 and a reconstructed image stored in the reconstructed-picture buffer 190, and generates a prediction signal.

The intra prediction unit 125 performs spatial prediction by using a pixel value of a pre-reconstructed neighboring block spatially adjacent to a current block to be encoded, and generates a prediction signal.

The subtractor 130 generates a residual signal by using the input image and the prediction signal generated through the inter prediction unit 120 or the intra prediction unit 125.

The transform unit 140 and the quantization unit 150 perform transform and quantization, respectively, on the residual signal generated through the subtractor 130, so that a quantized coefficient is generated.

The entropy encoding unit 160 outputs a bitstream by performing entropy encoding on encoding information such as syntax elements defined in a video compression standard, the quantized coefficient, and the like.

The inverse transform unit 145 and the inverse quantization unit 155 receive the quantized coefficient, and perform inverse quantization and inverse transform sequentially, thereby generating a reconstructed residual signal.

The adder 135 generates a reconstructed signal by using the prediction signal generated through the inter prediction unit 120 or the intra prediction unit 125, and the reconstructed residual signal.

The reconstructed signal is transmitted to the in-loop filter unit 180, and one or more in-loop filters, such as a deblocking filter, sample adaptive offset (SAO), and an adaptive loop filter (ALF), are applied to the reconstructed signal, so that a final reconstructed picture is generated. The final reconstructed picture is stored in the reconstructed-picture buffer 190.

The reconstructed picture stored in the reconstructed-picture buffer 190 may be used as a reference picture in the inter prediction unit 120.

Figure 2:
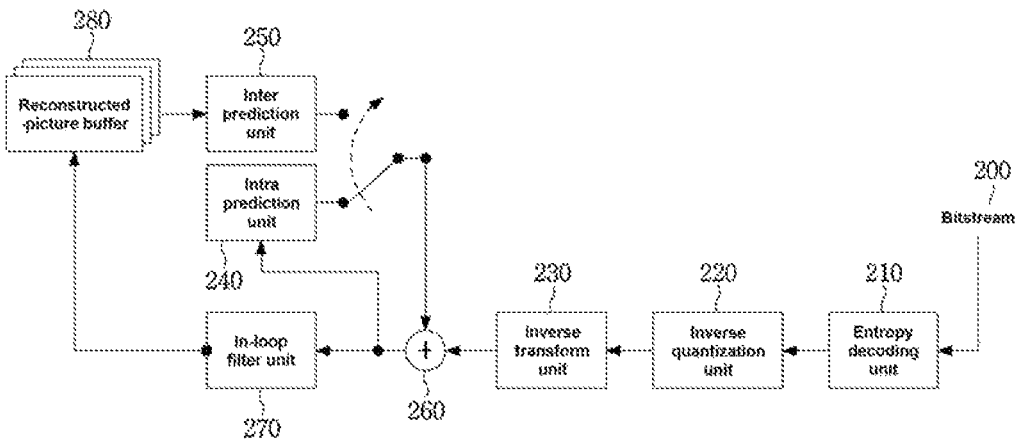
FIG. 2 is a block diagram showing a configuration for a method and a device for decoding a video according to an embodiment of the present invention.

FIG. 2 is a block diagram showing a configuration for a method and a device for decoding a video according to an embodiment of the present invention.

A device and a method of decoding a video according to an embodiment may include an entropy decoding unit 210, an inverse quantization unit 220, an inverse transform unit 230, an intra prediction unit 240, an inter prediction unit 250, an adder 260, a bi-directional filter unit 270, an in-loop filter unit 280, and a reconstructed-picture buffer 290.

The entropy decoding unit 210 outputs decoding information such as syntax elements, a quantized coefficient, and the like by decoding an input bitstream 200.

The inverse quantization unit 220 and the inverse transform unit 230 receive the quantized coefficient, and perform inverse quantization and inverse transform sequentially, thereby outputting a residual signal.

The intra prediction unit 240 performs spatial prediction by using a pixel value of a pre-decoded neighboring block adjacent to a current block to be decoded, and generates a prediction signal.

The inter prediction unit 250 performs motion compensation by using a motion vector extracted from the bitstream and a reconstructed image stored in the reconstructed-picture buffer 280, and generates a prediction signal.

The adder 260 generates a reconstructed signal by using the prediction signal generated through the intra prediction unit 240 or the inter prediction unit 250 and a reconstructed residual signal.

The bi-directional filter unit 270 performs bi-directional filtering on the reconstructed signal generated through the adder 260, thereby generating a signal to which the filter is applied.

The reconstructed signal is transmitted to the in-loop filter unit 270, and one or more in-loop filters, such as a deblocking filter, sample adaptive offset (SAO), and an adaptive loop filter (ALF), are applied to the reconstructed signal, so that a final reconstructed picture is generated. The final reconstructed picture is stored in the reconstructed-picture buffer 280.

The reconstructed picture stored in the reconstructed-picture buffer 280 may be used as a reference picture in the inter prediction unit 250.

Figure 3:
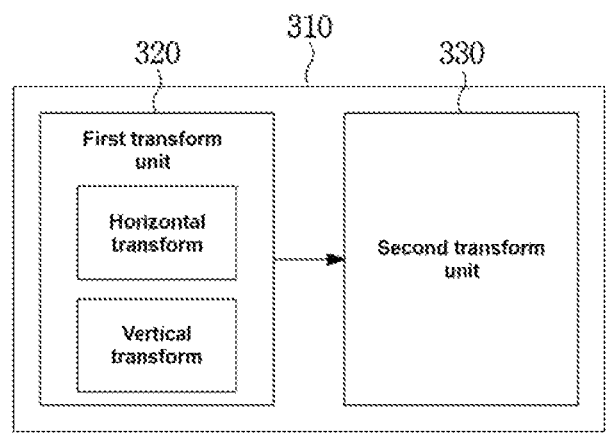
FIG. 3 is a diagram showing a technique of using various transforms in a transform unit of an encoder according to an embodiment of the present invention.

FIG. 3 is a diagram showing a technique of using various transforms in a transform unit of an encoder according to an embodiment of the present invention.

A transform unit 310 of the encoder may be composed of at least one of a first transform unit 320 or a second transform unit 330. The first transform unit may perform transform, and a result of the transform may be used in the second transform unit. Alternatively, transform may be performed in only one of the first transform unit and the second transform unit.

In the first transform unit 320, horizontal transform and vertical transform may be performed separately, and transform types may be determined for a horizontal direction and a vertical direction, respectively. The transform type may be determined to be one of multiple transform types pre-defined in the encoder.

That is, in the first transform unit 320 according to an embodiment of the present invention, one transform type of the multiple transform types may be selectively used for each of the horizontal direction and the vertical direction. The multiple transform types may include at least one of DCT-II (DCT2), DCT-IV (DCT4), DCT-V (DCT5), DCT-VIII (DCT8), DST-I (DST1), DST-IV (DST4), DST-VII (DST7), or ID (IDentity). Any one among the above-described transform types may be defined as a default transform type. For example, the default transform type may be DCT2, but is not limited thereto.

The number of transform types available in the first transform unit 320 may be one, two, three, four, five, or more. The number may be a fixed value preset in the encoder. Alternatively, the encoder may determine the optimum number, and may encode information specifying the number of the transform types. Herein, the information may be signaled at a level of a video sequence, a picture, a slice, a tile, or a predetermined fragment region (for example, a coding block, and a transform block). Alternatively, the number may be variably determined on the basis of an coding parameter. The coding parameter may include a size (length of width and height), a shape, a split type, a split depth, a prediction mode, a type of inter prediction mode, a value of an intra prediction mode, a component (for example, a luma component, and a chroma component) relating to a block, or the like. Herein, the block may refer to a current block or a neighbor block adjacent to the current block. The current block may refer to a coding block, a prediction block, or a transform block.

For example, in the case where the size of the current block is greater than n, the number of available transform types (namely, candidate transform types) may be one. In the case where the size of the current block is smaller than n, the number of candidate transform types may be two, three, or more. Herein, the value of n may be 16 or 32. In the case where the number of candidate transform types is one, the default transform mode described above may be used as the candidate transform type.

Among the transform types, the ID (IDentity) refers to using a unit matrix (identity matrix) as the kernel of transform. The meaning of performing transform by using the unit matrix may be interpreted as that transform is not performed. Therefore, according to an embodiment of the present invention, in performing transform in the horizontal direction or the vertical direction by using one transform type of the multiple transform types in the first transform unit 320, selecting the ID refers to omitting transform in the horizontal direction or the vertical direction. Through this, transform skip may be selectively applied to either the horizontal direction or the vertical direction.

In horizontal transform, selecting the ID as the transform type, refers to omitting horizontal transform. In vertical direction, selecting the ID as the transform type, refers to omitting vertical transform.

In both horizontal transform and vertical transform, selecting the ID as the transform type, refers to omitting both horizontal transform and vertical transform.

In the case where the ID, which is the transform type, is selected in both horizontal transform and vertical transform, a transform skip flag indicating that a transform step is not performed may not be included in a bitstream.

Alternatively, the multiple transform types described above may not include the ID. In this case, separate information for transform skip may be encoded. Herein, the information may refer to a flag that specifies whether transform is performed or skipped. The flag may be encoded on a per-block basis regardless of the vertical/horizontal direction. Alternatively, the flag may be encoded for each of the vertical direction and the horizontal direction. The encoding is performed only when the size of the current block is equal to or smaller than a predetermined first threshold value. The first threshold value may indicate the maximum size in which transform skip is allowed. The encoder may determine the optimum maximum size in which transform skip is allowed, and may encode the same for signaling. The size of the current block may be represented as the maximum value or the minimum value among the width and the height of the current block. The maximum size may be 4, 8, 16, 32, or 64.

Whether to use various transform types in the first transform unit may be included in the form of a flag in the bitstream.

Herein, the flag may specify whether to select any one of the multiple transform type, or use the default transform type pre-defined in the encoder. For example, if the flag is a first value, the transform type of the current block is derived from the multiple transform types. otherwise, the transform type of the current block is derived into the default transform type.

The flag may be selectively encoded on the basis of at least one of a size, a shape, a split type, a prediction mode, a type of inter prediction mode, a value of an intra prediction mode, or a component relating to a block.

For example, the flag is encoded only when the size of the block is equal to or smaller than m. Herein, the size of the block may be defined as the maximum value or the minimum value among the width W and the height H of the block. The value of m may be 8, 16, or 32. The size of the block may be defined as a sum (W+H), an area (W*H), or the like.

For example, the flag is encoded only when the shape of the block is a square. That is, when the ratio between the width and the height of the block is not 1, the flag is not encoded. Alternatively, the flag is encoded only when the shape of the block is a non-square. Alternatively, the flag is encoded only when the ratio (W/H or H/W) between the width and the height of the block is equal to or greater than a predetermined second threshold value even though the shape of the block is a non-square. The encoder may determine the optimum ratio between the width and the height, and may set the resulting value as the second threshold value.

For example, only when a split type of a high-level block is not a first split type, the flag is encoded for a low-level block. The split types include at least one of a quad tree (QT), a binary tree (BT), or a ternary tree (TT). The first split type may be any one (for example, TT) of the above-described split types. Even though the high-level block is split using the first split type, the flag is selectively encoded depending on the position of the low-level block.

For example, when the high-level block is split using the BT, the high-level block is composed of two low-level blocks BLK0 and BLK1. Herein, the flag may be encoded only for the left (or upper) low-level block, but may not be encoded for the right (or lower) low-level block. Alternatively, the flag may not be encoded for the left (or upper) low-level block, but may be encoded only for the right (or lower) low-level block.

For example, when the high-level block is split using the TT, the high-level block is composed of three low-level blocks BLK0, BLK1, and BLK2. Herein, the flag may not be encoded for the middle low-level block BLK1, but may be encoded only for the remaining low-level blocks BLK0 and BLK2. Alternatively, the flag may not be encoded for the right low-level block BLK2, but may be encoded only for the remaining low-level blocks BLK0 and BLK1.

For example, the flag is encoded only when the prediction mode of the block is an inter prediction mode. Alternatively, even though the prediction mode of the block is the inter prediction mode, the flag is encoded only when the inter prediction mode is a first mode. Herein, the first mode may refer to any one of the inter prediction modes pre-defined in the encoder, for example, a merge mode, an AMVP mode, an affine mode, and the like. Conversely, the flag is encoded only when the prediction mode of the block is an intra prediction mode. Alternatively, even though the prediction mode of the block is the intra prediction mode, the flag is encoded by considering whether a value (or angle) of the intra prediction mode is in a predetermined range. For example, only when the value of the intra prediction mode is in a range of mode 2 to mode 66, the flag is encoded.

For example, the flag is encoded only when the component of the block is a luma component. In this case, the transform type of the chroma component may be derived on the basis of the transform type of the luma component, or may be derived into the default transform type.

The above-described embodiments are not applied independently, and the flag may be encoded on the basis of a combination of at least two of the above-described embodiments. In the meantime, the flag may be encoded regardless of at least one of the above-described embodiments.

When the first transform unit does not use various transform types (that is, the flag is the first value), the transform type of the current block is set to be the default transform type.

Conversely, when the first transform unit uses various transform types (that is, the flag is a second value), any one of the multiple transform types is set as the transform type of the current block. Hereinafter, a method of determining the transform type of the current block on the basis of the multiple transform types will be described.

The encoder may determine the optimum transform type, and information on the determined transform type may be included in a bitstream (Embodiment 1).

The encoder may encode, on the basis of a preset table, the information on the transform type (hereinafter, referred to as a transform type index). The preset table is shown as in Table 1 below.

TABLE 1

| Transform type index | trTypeHor | trTypeVer |
|---|---|---|
| 1 | 0 | 0 |
| 0 | 1 | 1 |
| 1 | 2 | 1 |
| 2 | 1 | 2 |
| 3 | 2 | 2 |

When trTypeHor and trTypeVer are the same, the encoder encodes the transform type index having a value of 0 or 3.

Alternatively, when trTypeHor and trTypeVer are not same, the encoder encodes the transform type index having a value of 1 or 2.

Herein, trTypeHor denotes transform in the horizontal direction, and trTypeVer denotes transform in the vertical direction. The expression trTypeHor (or trTypeVer) of 1 may denote any one of the above-described multiple transform types, and the expression trTypeHor (or trTypeVer) of 2 may denote another one of the above-described multiple transform types. Table 1 shows (0,0), (1,1), (1,2), (2,1), and (2,2) as examples of combinations of trTypeHor and trTypeVer, but no limitation thereto is imposed. For example, combinations such as (0,1), (1,0), and the like may be added, and at least one of the combinations in Table 1 may be excluded. The number of the combinations may be two, three, four, five, six, seven, or more.

The encoder may determine the transform type of the current block on the basis of at least one of a size, a position, a shape, or a prediction mode relating to a block (Embodiment 2).

For example, the transform type may be determined on the basis of comparison in length between the width and the height of the current block. For example, the transform type of the shorter of the width and the height may be determined to be a first transform type, and the transform type of the longer may be determined to be a second transform type. Herein, the first transform type may be any one of the multiple transform types, and the second transform type may be another one of the multiple transform types. For example, the first transform type may be determined to be DCT (e.g., DCT2, DCT4, or DCT8), and the second transform type may be determined to be DST (e.g., DST4, DST7). Hereinafter, the same interpretation is possible. Conversely, the first transform type may be determined to be DST, and the second transform type may be determined to be DCT. When the width and/or the height is equal to or greater than a predetermined third threshold value, the transform type is determined to be the default transform type. Herein, the third threshold value is 16, 32, or 64.

For example, the transform type may be determined on the basis of the position of the current block. In the description below, the current block corresponds to a low-level block. A high-level block may be split into multiple low-level blocks. The split may be performed on the basis of at least one of a QT, a BT, a TT, or an asymmetry binary tree (ABT). Herein, the ABT is a technique of splitting one block asymmetrically into two sub-blocks SB0 and SB1. That is, the ratio of the width or height of the SB0 and the SB1 may be (1:r) or (r:1), and the value of r may be an integer of 2, 3, 4, or more. The encoder may determine the optimum ratio, and may encode the same for signaling to the decoder.

The transform type may be determined by considering the position of the low-level block within the high-level block.

(1) When the high-level block is split using the QT, the transform type of the upper-left low-level block BLK0 is determined to be the first transform type and the transform type of the lower-right low-level block BLK3 is determined to be the second transform type. The transform types of the upper-left/lower-right low-level block may be the same for the horizontal/vertical direction.

The transform types of the remaining low-level blocks BLK1 and BLK2 may be determined to be the first transform type and/or the second transform type. The transform types of the remaining low-level blocks may be the same for the horizontal/vertical direction. Alternatively, for the upper-right low-level block BLK1, the transform type in the vertical direction may be determined to be the first transform type, and the transform type in the horizontal direction may be determined to be the second transform type. The lower-left low-level block BLK2 may be determined to be the same as the BLK1. Alternatively, for the BLK2, the transform type in the horizontal direction may be determined to be the first transform type, and the transform type in the vertical direction may be determined to be the second transform type.

Alternatively, the transform type for at least one of the above-described BLK1, BLK2, or BLK3 may be determined to be the default transform type.

(2) When the high-level block is split using the BT or ABT, the transform type of the left (or upper) low-level block is determined to be the first transform type and the transform type of the right (or lower) low-level block is determined to be the second transform type.

Further, the transform types of the left (or upper) low-level block may be the same or different from each other for the horizontal/vertical direction. For example, for the left low-level block, the transform type in the horizontal direction may be the first transform type, but the transform type in the vertical direction may be the second transform type. Alternatively, for the upper low-level block, the transform type in the vertical direction may be the first transform type, but the transform type in the horizontal direction may be the second transform type.

The transform types of the right (or lower) low-level block may be limited to be the same for the horizontal/vertical direction. Alternatively, the transform types of the right (or lower) low-level block may be determined to be different from each other for the horizontal/vertical direction.

(3) When the high-level block is split using the TT, the transform type of the left (or top) low-level block BLK0 is determined to be the first transform type and the transform type of the right (or bottom) low-level block BLK2 is determined to be the second transform type.

Further, the transform types of the left (or top) low-level block may be the same or different from each other for the horizontal/vertical direction. For example, for the left low-level block, the transform type in the horizontal direction may be the first transform type, but the transform type in the vertical direction may be the second transform type. Alternatively, for the top low-level block, the transform type in the vertical direction may be the first transform type, but the transform type in the horizontal direction may be the second transform type.

The transform types of the right (or bottom) low-level block may be limited to be the same for the horizontal/vertical direction. Alternatively, the transform types of the right (or bottom) low-level block may be determined to be different from each other for the horizontal/vertical direction.

In the meantime, the transform types of the middle low-level block BLK1 may be determined to be the first transform type and/or the second transform type. For the BLK1, the transform type in the vertical direction may be different from the transform type in the horizontal direction. Alternatively, the transform type for the BLK1 may be determined to be the default transform type pre-defined in the encoder.

For example, the transform type may be determined on the basis of whether the prediction mode of the current block is the inter prediction mode. For example, if the prediction mode of the current block is the inter prediction mode, the first transform type or the second transform type is used. Otherwise, the default transform type is used. Alternatively, if the prediction mode of the current block is the inter prediction mode, the first transform type is used. otherwise, the second transform type or the default transform type is used.

The above-described embodiments may be applied independently, and the encoder may determine the transform type on the basis of a combination of the first and the second embodiments. The transform type determined on the basis of the first embodiment described above may be replaced by the transform type determined on the basis of the second embodiment. Conversely, the transform type determined on the basis of the second embodiment described above may be replaced by the transform type determined on the basis of the first embodiment.

In the first transform unit, transform may be performed on the basis of the determined transform type.

In the second transform unit 330, additional transform is performed on the signaled processed in the first transform unit 320. Performing the additional transform may be omitted.

In the second transform unit 330, horizontal transform and vertical transform may be performed in an integrated form, and the method of transform may be determined by the size of the block and the prediction mode of the block.

Information on transform performed in the second transform unit 330 may be included in the form of an index in the bitstream.

Figure 4:
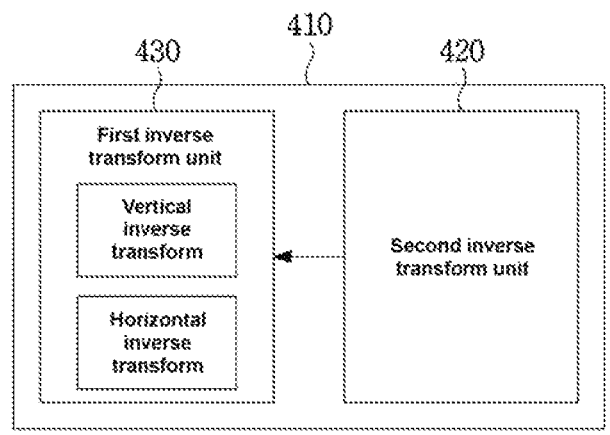
FIG. 4 is a diagram showing a technique of using various inverse transforms in an inverse transform unit of a decoder according to an embodiment of the present invention.

FIG. 4 is a diagram showing a technique of using various inverse transforms in an inverse transform unit of a decoder according to an embodiment of the present invention.

The inverse transform unit 410 of the decoder may be composed of at least one of a first inverse transform unit 420 or a second inverse transform unit 430. The second inverse transform unit may perform inverse transform, and a result of the inverse transform is used in the first inverse transform unit. However, as described above with reference to FIG. 3, inverse transform may be performed in only one of the first inverse transform unit and the second inverse transform unit.

In the first inverse transform unit 420, horizontal inverse transform and vertical inverse transform may be performed separately, and inverse transform types may be determined for a horizontal direction and a vertical direction, respectively. The inverse transform type may be determined to be one of multiple inverse transform types pre-defined in the decoder.

The multiple inverse transform types may include at least one of DCT-II (DCT2), DCT-IV (DCT4), DCT-V (DCT5), DCT-VIII (DCT8), DST-I (DST1), DST-IV (DST4), DST-VII (DST7), or ID (IDentity). Any one among the above-described inverse transform types may be defined as a default inverse transform type. For example, the default inverse transform type may be DCT2, but is not limited thereto.

In the meantime, the number of inverse transform types available in the first inverse transform unit is the same as that described above with reference to FIG. 3, and thus a detailed description thereof will be omitted.

In horizontal inverse transform, selecting the ID, which is the transform type, refers to omitting horizontal inverse transform. In vertical direction, selecting the ID as the inverse transform type refers to omitting vertical inverse transform. Through this, transform skip may be selectively applied to either the horizontal direction or the vertical direction.

In both horizontal inverse transform and vertical inverse transform, selecting the ID as the transform type refers to omitting both horizontal inverse transform and vertical inverse transform.

In the case where the ID is selected as the transform type in both horizontal inverse transform and vertical inverse transform, extraction of a transform skip flag indicating that an inverse transform step is not performed may be omitted.

Alternatively, the multiple inverse transform types described above may not include the ID. In this case, separate information for transform skip may be signaled. Herein, the information may refer to a flag that specifies whether inverse transform is performed or skipped. The flag may be decoded on a per-block basis regardless of the vertical/horizontal direction. Alternatively, the flag may be decoded for each of the vertical direction and the horizontal direction. The decoding is performed only when the size of the current block is equal to or smaller than a predetermined first threshold value. The first threshold value may indicate the maximum size in which transform skip is allowed. As described above, the encoder may determine the optimum maximum size in which transform skip is allowed, and may encode the same for signaling to the decoder. The size of the current block may be represented as the maximum value or the minimum value among the width and the height of the current block. The maximum size may be 4, 8, 16, 32, or 64.

Whether to use various transform types in the first inverse transform unit may be determined by using flag information included in a bitstream. The flag information is the same as that described in detail with reference to FIG. 3, and thus a detailed description thereof will be omitted.

When the flag information indicates that the first inverse transform unit does not use various transform types (that is, the flag is a first), the transform type of the current block is set to be the default transform type.

When the flag information indicates that the first inverse transform unit uses various transform types (that is, the flag is a second value), any one of the multiple transform types is determined as the transform type of the current block. A method of determining the transform type of the current block on the basis of the multiple transform types is the same as that described above with reference to FIG. 3, and thus a detailed description thereof will be omitted.

The first inverse transform unit may perform, on the basis of the determined inverse transform type, inverse transform on a decoded residual coefficient.

A matrix for the inverse transform may be pre-defined in the encoder/decoder for each inverse transform type. The matrix may be defined as a size of 4×4, 8×8, 16×16, 32×32, or 64×64. A predetermined number of matrices may be defined for each inverse transform type. For example, p1 N1×N1 matrices may be defined for a first inverse transform type, p2 N2×N2 matrices may be defined for a second inverse transform type, and p3 N3×N3 matrices may be defined for a default inverse transform type.

Herein, the p1 to the p3 may be 1, 2, 3, or 4. The p1 to the p3 may be the same values, or at least one of the p1 to the p3 may be different from another. Alternatively, any one of the p1 to the p3 may be 0. For example, in the case where p1=1 and p2=0, the matrix for the second inverse transform type may be derived on the basis of the matrix for the first inverse transform type. The derivation may be performed rotating the matrix for the first inverse transform type at a predetermined angle (e.g., degrees, 180 degrees, −90 degrees, or −180 degrees). Alternatively, the derivation may be performed changing a sign of at least one of the components constituting the matrix. The derivation may be performed using both the rotating and the changing of the sign.

The N1 to the N3 each may be one of 4, 8, 16, 32, or 64. The N1 to the N3 may be the same values, or at least one of the N1 to the N3 may be different from another. The decoder may define a 64×64 matrix, and at least one of 4×4, 8×8, 16×16, or 32×32 matrices may be derived from a 64×64 matrix.

In the second inverse transform unit 430, horizontal inverse transform and vertical inverse transform may be performed in an integrated from, and the method of second inverse transform may be determined by the size of the block, the prediction mode of the block, and information on a second inverse transform index included in the bitstream.

In the meantime, in FIGS. 3 and 4, the block or the current block may refer to a coding block CU. Herein, the coding block may refer to a coding block that is no longer split by the predetermined split type (the QT, the BT, the TT, the ABT, or the like). Alternatively, the block or the current block may refer to a sub-block obtained by additionally splitting the coding block. That is, transform may be performed on a per-coding-block basis, or transform may be performed on a per-sub-block basis. Transform may be performed only on one or several sub-blocks of the sub-blocks of the coding block, and transform may be omitted for the remaining sub-blocks.

Herein, the split may be performed on the basis of the predetermined split type (the QT, the BT, the TT, the ABT, or the like). Alternatively, the split may be limited to be performed using only the QT and/or the BT. The number of times that additional split is performed may be limited to one.

Split into the sub-blocks may be performed on the basis of a predetermined coding parameter. The coding parameter may refer to a flag (sbt_flag) indicating whether the coding block is additionally split on the basis of the predetermined split type. Alternatively, the coding parameter may refer to a flag (sbt_flag) indicating whether transform is performed on the whole coding block or transform is performed only on one or several sub-blocks among multiple sub-blocks within the coding block.

The flag (sbt_flag) may be signaled at at least one level among a video sequence, a picture, a slice, and a block. The signaling may be performed on the basis of at least one among a size, a shape, or a prediction mode of a block.

For example, the flag (sbt_flag) is signaled only when the size of the block is equal to or smaller than a predetermined fourth threshold value. Herein, the size of the block may be represented as the maximum value or the minimum value among the width and the height of the current block. The fourth threshold value may refer to the maximum block size in which additional split into sub-blocks is allowed. Alternatively, the flag (sbt_flag) is signaled only when the size of the block is equal to or greater than a predetermined fourth threshold value. Herein, the size of the block may be represented as the maximum value or the minimum value among the width and the height of the current block. The fourth threshold value may refer to the minimum block size in which additional split into sub-blocks is allowed. The fourth threshold value may be a fixed value preset in the encoder/decoder, or may be encoded by the encoder for signaling to the decoder.

For example, the flag (sbt_flag) is signaled only when the shape of the block is a square. Alternatively, the flag (sbt_flag) is signaled only when the shape of the block is a non-square.

For example, the flag (sbt_flag) is signaled only when the prediction mode of the block is the inter prediction mode. Alternatively, the flag (sbt_flag) is signaled only when the prediction mode of the block is the intra prediction mode. The signaling of the flag may be performed regardless of at least one among the size, the shape, or the prediction mode of the block described above.

When transform is performed only on one or several sub-blocks according to the flag (sbt_flag), information specifying the one or several sub-blocks is signaled. The one or several sub-blocks may refer to sub-blocks including at least one non-zero transform coefficient. Therefore, the information may be a flag (coded_block_flag) indicating whether to include the at least one non-zero transform coefficient. The flag (coded_block_flag) may be signaled on a per-sub-block basis.

Alternatively, the information may be position information indicating the position of the sub-block having at least one non-zero transform coefficient. For example, when the coding block is split using the QT, indexes of 0 to 3 are assigned to the sub-blocks, respectively. When the position information of the index 0 is signaled, the upper-left sub-block is determined as a block having at least one non-zero transform coefficient.

Alternatively, the information may be position information indicating the position of the sub-block not having at least one non-zero transform coefficient. For example, when the coding block is split using the BT, indexes of 0 to 1 are assigned to the sub-blocks, respectively. When the position information of the index 1 is signaled, the right (or lower) sub-block is determined as a block not having at least one non-zero transform coefficient and conversely, the left (or upper) sub-block is determined as a block having at least one non-zero transform coefficient.

Inverse transform types may be determined only for one or several sub-blocks specified by the flag (coded_block_flag) or the position information. That is, only for the specified sub-blocks, information for determining the inverse transform type may be decoded or the above-described process of deriving the inverse transform type may be performed. For the sub-blocks not specified by the position information, a value of the transform coefficient may be set to 0.

The embodiments of FIGS. 3 and 4 may be applied to the embodiments of FIGS. 5 to 13 equally/similarly, and a repeated description will be omitted below.

Figure 5:
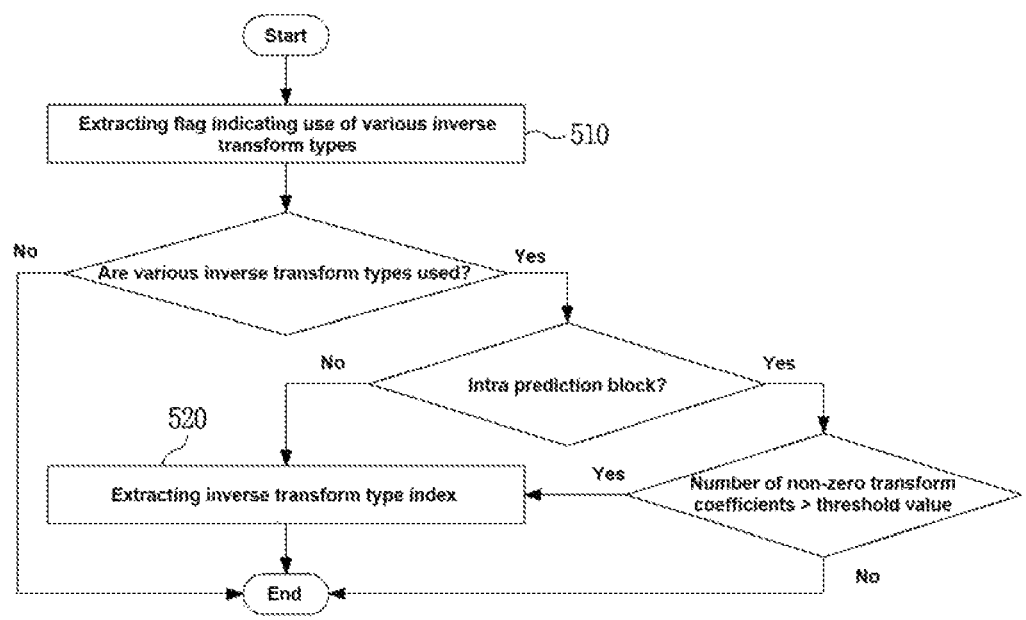
FIG. 5 is a diagram showing a process of extracting information for first inverse transform from a bitstream according to an embodiment of the present invention.

FIG. 5 is a diagram showing a process of extracting information for first inverse transform from a bitstream according to an embodiment of the present invention.

First, a flag indicating whether to perform inverse transform using various inverse transform types is extracted from a bitstream at step 510.

When the extracted flag does not indicate performing inverse transform that uses various inverse transform types, the information extraction step for various inverse transforms is terminated.

When inverse transform using various inverse transform types is not performed, inverse transform is performed using a predetermined transform type.

When the extracted flag indicates performing inverse transform that uses various inverse transform types, extracting additional information for various inverse transforms is performed.

When the block is not the block subjected to intra prediction, an index value for determining various inverse transform types is extracted.

In the case of the block subjected to intra prediction, if the number of non-zero transform coefficients obtained as a result of inverse quantization is greater than a threshold value, the index value for determining various inverse transform types is extracted at step 520. Otherwise, the index value for determining various inverse transform types is not extracted.

Figure 6:
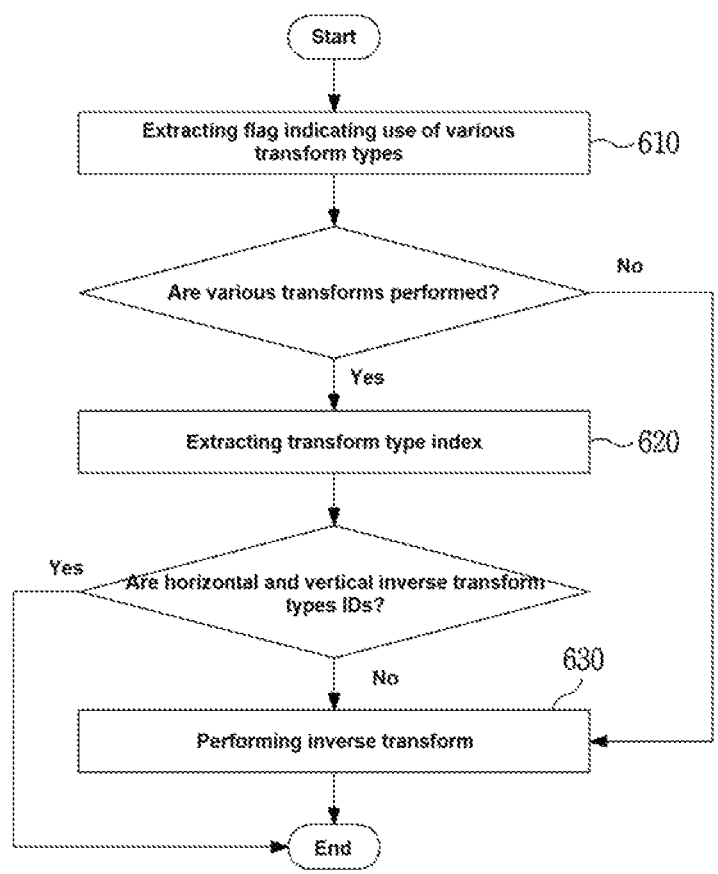
FIG. 6 is a diagram showing a process of performing first inverse transform depending on various inverse transform types according to an embodiment of the present invention.

FIG. 6 is a diagram showing a process of performing first inverse transform depending on various inverse transform types according to an embodiment of the present invention.

First, a flag indicating whether to perform inverse transform using various inverse transform types is extracted from a bitstream at step 610.

When the extracted flag, which indicates whether to perform inverse transform using various inverse transform types, does not indicate performing inverse transform that uses various inverse transform types, inverse transform is performed using a predetermined transform type at step 630.

When the extracted flag, which indicates whether to perform inverse transform using various inverse transform types, indicates performing inverse transform that uses various transform types, an index value for determining various inverse transform types is extracted at step 620.

When the horizontal inverse transform type obtained through the extracted index value is the ID, horizontal inverse transform is omitted and only vertical inverse transform is performed, at the inverse transform performance step 630.

When the vertical inverse transform type obtained through the extracted index value is the ID, vertical inverse transform is omitted and only horizontal inverse transform is performed, at the inverse transform performance step 630.

When both the horizontal inverse transform type and the vertical inverse transform type obtained through the extracted index value are the IDs, the inverse transform performance step 730 is omitted.

Figures 7, 8:
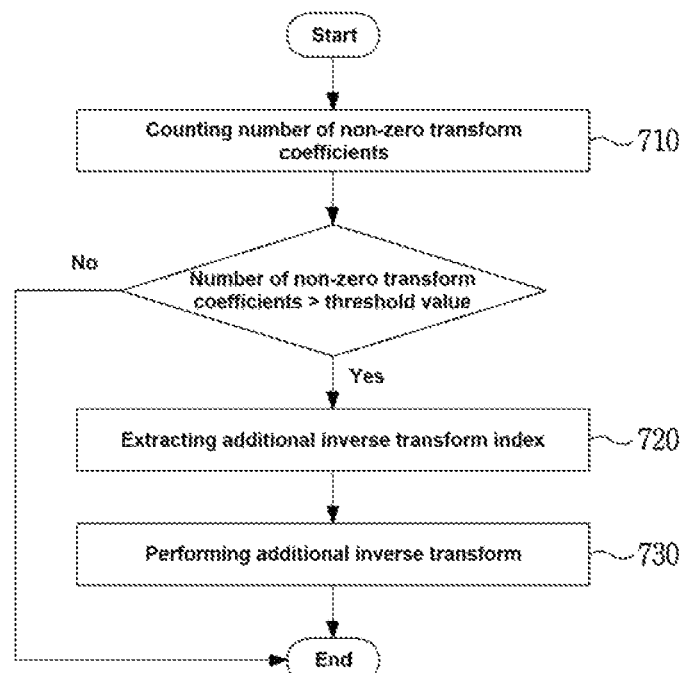
FIG. 7 is a diagram showing a process of performing second inverse transform according to an embodiment of the present invention.
FIG. 8 is a diagram showing a method of signaling, by using syntax, whether various inverse transform techniques are used according to an embodiment of the present invention.

FIG. 7 is a diagram showing a process of performing second inverse transform according to an embodiment of the present invention.

First, the number of non-zero transform coefficients among transform coefficients obtained through inverse quantization is counted at step 710 to determine whether to extract a second inverse transform index.

When the number of the non-zero transform coefficients is greater than a threshold value, a second inverse transform index extraction step 720 is omitted.

When the number of the non-zero transform coefficients is greater than the threshold value, a second inverse transform performance step 730 is omitted.

When the number of the non-zero transform coefficients is less than the threshold value, a second inverse transform index is extracted at step 720.

At the second inverse transform performance step 730, inverse transform is performed according to the extracted second inverse transform index.

At the second inverse transform performance step 730, a method of performing second inverse transform may be determined according to the size and the prediction mode of the block.

FIG. 8 is a diagram showing a method of signaling, by using syntax, whether various inverse transform techniques are used according to an embodiment of the present invention.

Information on whether the proposed various inverse transform techniques are used may be included within a sequence parameter set (SPS) 810 of the Network Abstract Layer (NAL) present in a compressed bitstream. In addition, a block using intra prediction and a block using inter prediction may or may not use a transform technique of applying various types, independently of each other. That is, according to an embodiment of the present invention, a transform technique for applying various transform types may be used only in the block using intra prediction, and a transform technique of applying a fixed transform type may be used in the block using inter prediction.

Information 820 on whether various inverse transform types are used in the block using intra prediction may be included within the sequence parameter set (SPS) 810 of the Network Abstract Layer (NAL) present in a bitstream.

Information 830 on whether various inverse transform types are used in the block using inter prediction may be included within the sequence parameter set (SPS) 810 of the Network Abstract Layer (NAL) present in a bitstream.

Information 840 on whether second inverse transform is used may be included within the sequence parameter set (SPS) 810 of the Network Abstract Layer (NAL) present in a bitstream in the compressed bitstream.

FIG. 9 is a diagram showing a method of signaling, by using coding unit syntax of syntax in a bitstream, information for performing various transform techniques, in a method and a device using various inverse transform techniques according to an embodiment of the present invention.

A flag 920 indicating whether various inverse transform techniques are used may be included within coding unit syntax 910 of the Network Abstract Layer (NAL) present in a compressed bitstream.

When the flag, which indicates whether various inverse transform techniques are used, indicates that various inverse transform techniques are used, various inverse transform type indexes 930 indicating information on various inverse transform types are included within the coding unit syntax 910 of the Network Abstract Layer (NAL) present in the compressed bitstream.

A second inverse transform index 940 indicating information on second inverse transform may be included within coding unit syntax 1010 of the Network Abstract Layer (NAL) present in the compressed bitstream.

Figure 10:
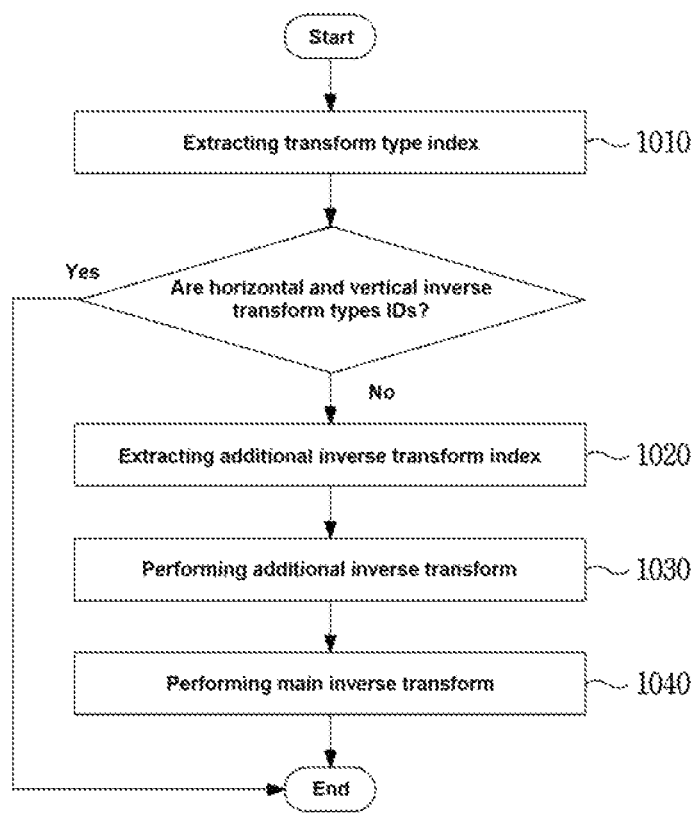
FIG. 10 is a diagram showing another example of an inverse transform process in a method and a device using various inverse transform techniques according to an embodiment of the present invention.

FIG. 10 is a diagram showing another example of an inverse transform process in a method and a device using various inverse transform techniques according to an embodiment of the present invention.

Whether various inverse transform techniques are used may not be included in the form of a flag in a bitstream. Only an inverse transform type index may be included in a bitstream, and whether to perform a first inverse transform process may be determined through an inverse transform type index.

First, the inverse transform type is determined through extraction 1010 of the inverse transform type index from a bitstream.

When both the determined horizontal and vertical inverse transform types are the IDs, a second inverse transform index extraction process 1020 and a second inverse transform performance process 1030 are omitted.

When both the determined horizontal and vertical inverse transform types are the IDs, a first inverse transform performance process 1040 is omitted.

When both the determined horizontal and vertical inverse transform type are the IDs, extraction of a transform skip flag indicating that inverse transform is not performed is omitted.

When both the horizontal and the vertical inverse transform types are not the IDs, a second inverse transform index is extracted at step 1020, and second inverse transform is performed according to the extracted index at step 1030.

When the horizontal inverse transform type is the ID, horizontal inverse transform is omitted and only vertical inverse transform is performed, at the first inverse transform performance step 1040.

When the vertical inverse transform type is the ID, vertical inverse transform is omitted and only horizontal inverse transform is performed, at the first inverse transform performance step 1040.

When both the horizontal and the horizontal inverse transform types are not the IDs, both horizontal and vertical inverse transform are performed at the first inverse transform performance step 1040.

Figure 11:
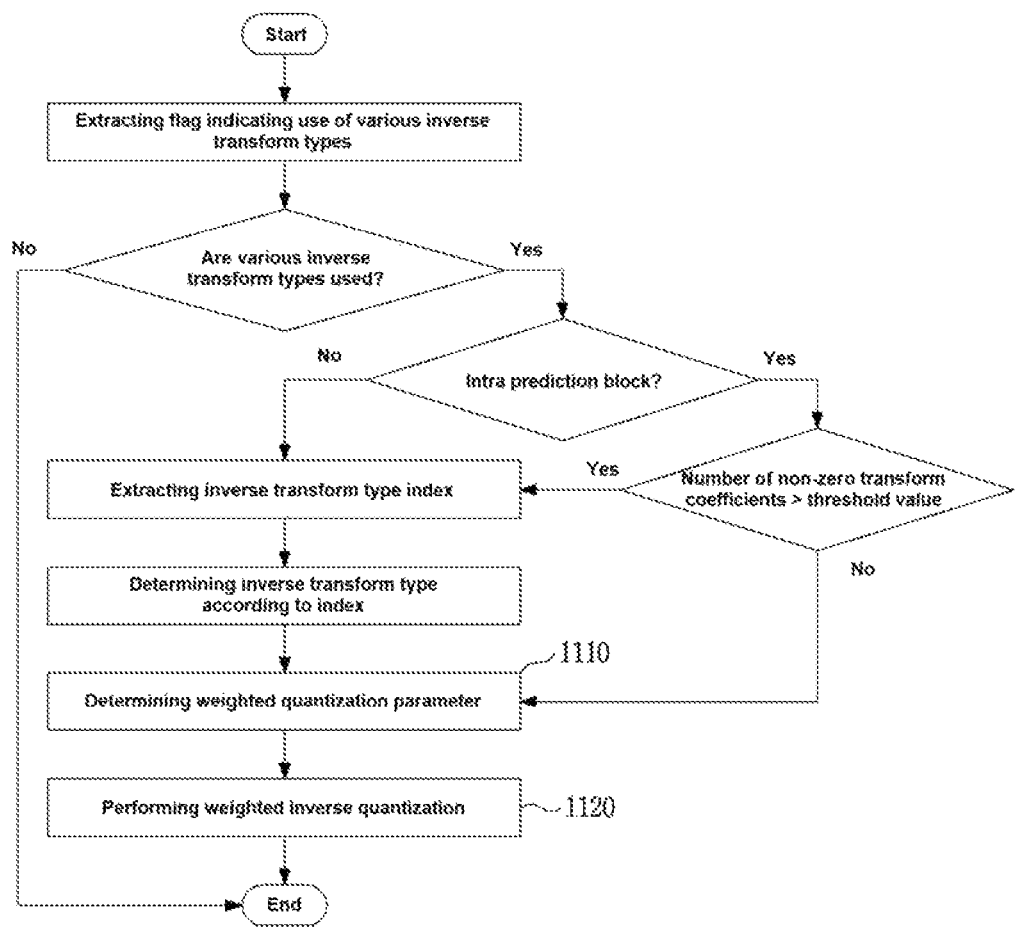
FIG. 11 is a diagram showing a process of performing weighted quantization for each of different frequencies, when various inverse transform techniques are used according to an embodiment of the present invention.

FIG. 11 is a diagram showing a process of performing weighted quantization for each of different frequencies, when various inverse transform techniques are used according to an embodiment of the present invention.

When various inverse transform techniques are used, weighted inverse quantization for each frequency is performed according to the inverse transform type determined by the extracted inverse transform type index.

When weighted inverse quantization for each frequency is performed according to the inverse transform type, weighted inverse quantization for each frequency according to the inverse transform type is performed by using a quantization parameter included in a bitstream, at a weighted quantization parameter determination step 1110 and a weighted inverse quantization performance step 1120 for each frequency.

When weighted inverse quantization for each frequency is performed according to the inverse transform type, weighted inverse quantization is performed by selecting a quantization parameter value according to the inverse transform type among pre-defined quantization parameters, at the weighted quantization parameter determination step 1110 and the weighted inverse quantization performance step 1120 for each frequency.

Figure 12:
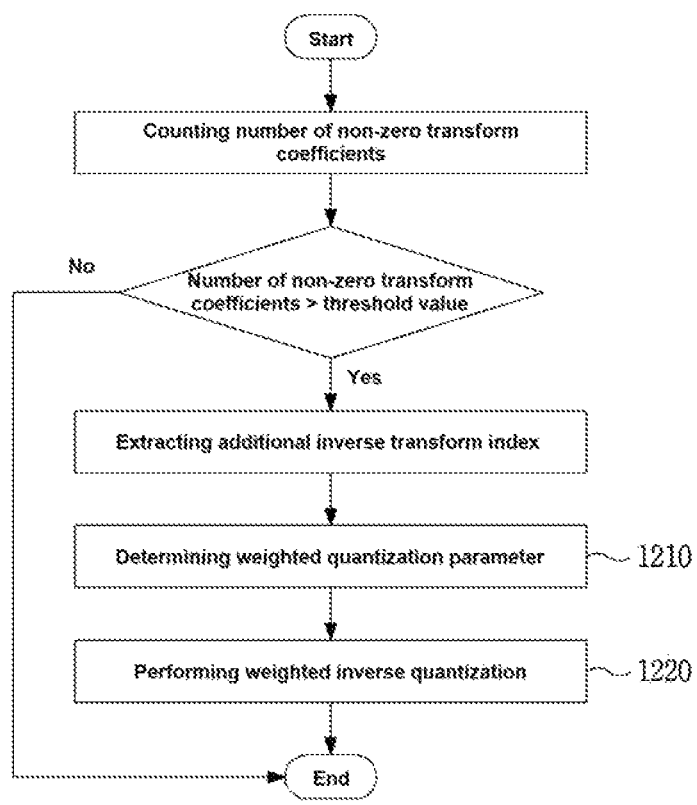
FIG. 12 is a diagram showing a process of performing weighted quantization for each of different frequencies, when a second inverse transform technique is used according to an embodiment of the present invention.

FIG. 12 is a diagram showing a process of performing weighted quantization for each of different frequencies, when a second inverse transform technique is used according to an embodiment of the present invention.

When the second inverse transform technique is used, weighted inverse quantization for each frequency is performed according to the extracted second inverse transform index.

When weighted inverse quantization for each frequency is performed according to the second inverse transform index, weighted inverse quantization is performed by using a quantization parameter included in a bitstream, at a weighted quantization parameter determination step 1210 and a weighted inverse quantization performance step 1220.

When weighted inverse quantization for each frequency is performed according to the second inverse transform index, weighted inverse quantization is performed by selecting a quantization parameter according to the second inverse transform index among pre-defined quantization parameters, at the weighted quantization parameter determination step 1210 and the weighted inverse quantization performance step 1220.

FIG. 13 is a diagram showing a method of signaling information for weighted quantization by using syntax, when various inverse transforms or second inverse transform is performed according to an embodiment of the present invention.

When various inverse transforms or second inverse transform is performed, information for weighted quantization may be included within a sequence parameter set (SPS) 1310 of the Network Abstract Layer (NAL) present in a compressed bitstream.

A flag 1320 indicating whether weighted quantization is used when various inverse transforms or second inverse transform is performed may be included within the sequence parameter set (SPS) 1310 of the Network Abstract Layer (NAL) present in a bitstream.

When the flag 1320, which indicates whether weighted quantization is used, indicates that weighted quantization is used, a flag 1330 indicating transmission of a weighted quantization parameter on a per-sequence basis is included within the sequence parameter set (SPS) 1310 of the Network Abstract Layer (NAL) present in a bitstream.

When the flag 1330, which indicates transmission of the weighted quantization parameter on a per-sequence basis, indicates transmission of the weighted quantization parameter, quantization parameters are included in the bitstream, and a process 1340 of extracting the parameters is performed.

When various inverse transforms or second inverse transform is performed, information for weighted quantization may be included within a picture parameter set (PPS) 1350 of the Network Abstract Layer (NAL) present in a compressed bitstream.

A flag 1360 indicating transmission of a weighted quantization parameter on a per-picture basis may be included within the picture parameter set (PPS) 1350 of the Network Abstract Layer (NAL) present in a bitstream.

When the flag 1360 indicating transmission of the weighted quantization parameter on a per-picture basis indicates transmission of the weighted quantization parameter, quantization parameters are included in the bitstream, and a process 1370 of extracting the parameters is performed.

INDUSTRIAL APPLICABILITY

The present invention may be used in encoding/decoding a video signal by using various transform techniques.

The invention claimed is:

1. A method of decoding a video, the method comprising:
   obtaining, from a bitstream, first information indicating whether a first inverse transform is skipped for a current block;
   obtaining, from the bitstream, second information on a horizontal transform type and a vertical transform type for the first inverse transform of the current block when the first information indicates that the first inverse transform is not skipped for the current block;
   determining the horizontal transform type and the vertical transform type selectively from multiple inverse transform types by using the second information; and
   performing the first inverse transform for the current block in horizontal and vertical directions by using the determined horizontal transform type and the determined vertical transform type,
   wherein the second information indicates one of a plurality of transform type sets,
   wherein each of the transform type sets includes a transform type of a horizontal direction and a transform type of a vertical direction, and
   wherein the each of the transform type sets is defined based on a combination of two of the multiple inverse transform types.

2. The method of claim 1, wherein the performing the first inverse transform for the current block in horizontal and vertical directions by using the determined horizontal transform type and the determined vertical transform type comprises:

performing the first inverse transform by using the horizontal transform type determined among the multiple inverse transform types; and performing the first inverse transform by using the vertical transform type determined among the multiple inverse transform types.

3. The method of claim 1, wherein a number of the multiple inverse transform types is 3.

4. The method of claim 1, wherein the multiple inverse transform types include DCT-2, DCT-8 and DST-7 based transform kernels, and do not include a non-transform matrix.

5. The method of claim 1, wherein the first information is encoded in units of blocks regardless of horizontal and vertical directions.

6. The method of claim 1, further comprises:

obtaining, from the bitstream, a flag indicating whether the horizontal transform type and the vertical transform type is determined based on the multiple inverse transform types, wherein when the flag indicates that the horizontal transform type and the vertical transform type is not determined based on the multiple inverse transform types, the horizontal transform type and the vertical transform type is determined based on a pre-defined default transform type.

7. The method of claim 6, wherein the default transform type is a DCT-2 based transform kernel.

8. The method of claim 1, further comprises:

obtaining, from the bitstream, third information indicating whether a second inverse transform is performed for the current block.

9. The method of claim 8, wherein the second inverse transform has a non-separable form in horizontal and vertical directions.

10. A method of encoding a video, the method comprising:

determining whether a first transform is skipped for a current block;

determining a horizontal transform type and a vertical transform type selectively from multiple transform types;

encoding information on the horizontal transform type and the vertical transform type for the first transform of the current block when it is determined that first transform is not skipped for the current block; and encoding a residual block of the current block, the residual block being encoded by performing the first transform for the current block in horizontal and vertical directions by using the horizontal transform type and the vertical transform type, wherein the information indicates one of a plurality of transform type sets, wherein each of the transform type sets includes a transform type of a horizontal direction and a transform type of a vertical direction, and wherein the each of the transform type sets is defined based on a combination of two of the multiple inverse transform types.

* * * * *